Figures 1, 2:
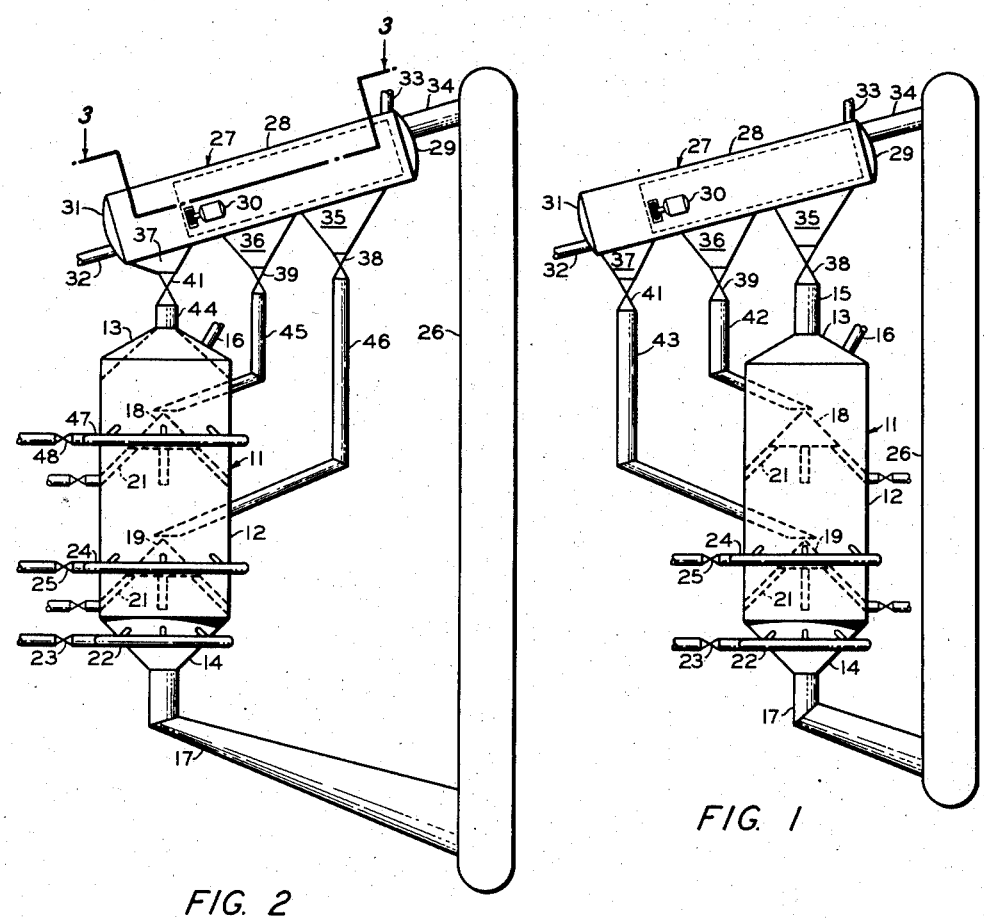

Oct. 21, 1952          R. K. SIMMS          2,614,968

PEBBLE HEATER AND METHOD OF CONVERTING HYDROCARBONS

Filed Dec. 12, 1949

INVENTOR
R. K. SIMMS

BY Hudson and Young

ATTORNEYS

Patented Oct. 21, 1952

2,614,968

UNITED STATES PATENT OFFICE 2,614,968

PEBBLE HEATER AND METHOD OF CONVERTING HYDROCARBONS

Russell K. Simms, Bartlesville, Okla., assignor to Phillips Petroleum Company, a corporation of Delaware Application December 12, 1949, Serial No. 132,469

10 Claims. (Cl. 196—55)

This invention relates to pebble heat exchangers. In one of its more specific aspects it relates to means for using pebbles of different sizes and compositions in pebble heater apparatus. In another of its more specific aspects it relates to a method for carrying out multi-stage reactions or a plurality of reactions in pebble heater apparatus. In another of its more specific aspects it relates to improved pebble heat exchange apparatus.

Thermal conversion processes which are carried out in so-called pebble heater apparatus utilize a fluent mass of solid heat exchange material which mass is heated to a high temperature by passing hot gas therethrough in a first direct heat exchange step and is then caused to contact fluid reactant materials, furnishing heat thereto in a second direct heat exchange. The conventional pebble heater apparatus generally comprises two upright chambers which may be disposed in substantially vertical alignment. The solid heat exchange material is introduced into the upper portion of the first chamber. That material forms a moving bed of solid heat exchange material which flows downwardly through the chamber in direct heat exchange with hot gaseous heat exchange material. The solid heat exchange material is heated to a high temperature in the heat exchange and is then passed to a second chamber in which the hot solid heat exchange material is caused to contact the fluid reactant materials in a second direct heat exchange relation, furnishing heat for the treatment or conversion of the fluid materials.

Conventional pebble heater chambers of pebble heater apparatus are generally formed as cylinders in which a solid heat exchange material is collected in the form of a moving bed. Hot heat exchange gases are passed upwardly through the cylindrical bed, sometimes being introduced thereinto at the periphery of the bed and at its lower end, and are sometimes introduced through a refractory arch which supports the moving pebble bed. At other times, heat is supplied to the heating chamber by supplying a fuel to the lower portion of the pebble bed within the heater chamber and burning the fuel on the surface of the pebbles so as to heat the pebbles by combustion and further heating the pebbles by passing the resulting combustion gas upwardly through the downflowing fluent mass of pebbles.

The heated pebbles are introduced into the upper portion of a reaction chamber and reactant materials are introduced into the lower portion of the reaction chamber and are caused to flow upwardly through the downflowing fluent hot pebble mass therein, thereby obtaining the heat required for thermal conversion of the reactant materials. Reaction products are removed from the upper portion of the reaction chamber generally at points above the top surface of the pebble bed. One disadvantage which is encountered in the use of conventional pebble heater apparatus is the fact that single reaction chambers are generally confined to single reactions therein. The high cost of pebble heater reaction chambers makes it economically desirable to utilize a single chamber for a plurality of concomitant reactions.

Broadly speaking, this invention comprises an improved means and method for carrying out multiple steps of reactions in a single reaction chamber. At least two groups of pebbles of different diameters are introduced into a pebble heater chamber. The pebbles may be catalytic or inert as desired. The groups of pebbles are heated to different temperatures according to their sizes and compositions in an obliquely disposed pebble heater chamber and are introduced into a reaction chamber at points disposed successively along the length of the reaction chamber. Reactant materials are introduced into the lower portion of the reaction chamber where, if they are non-gaseous, they are partially or completely vaporized. The vapors are passed upwardly through the downflowing pebble mass and contact the pebbles of different sizes, temperatures, and activity, and undergo the various stages of the desired reactions. The pebbles are recycled to the pebble heater chamber where they are heated and separated according to size.

Solid heat exchange material which is conventionally used in pebble heater apparatus is generally called "pebbles." The term pebbles as used herein denotes any solid refractory material of flowable size and form, having strength, which is suitable to carry large amounts of heat from the pebble heating chamber to the reaction chamber without rapid deterioration or substantial breaking. Pebbles which are satisfactorily used in pebble heater apparatus are substantially spherical in shape and range from about one-eighth inch to about one inch in diameter. In high temperature processes, pebbles having a diameter of between about one-eighth inch and one-half inch are preferred. The pebbles must be formed of a refractory material which will withstand temperatures at least as high as the highest temperatures attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, thoria, beryllia, stellite, zirconia, and mullite may be satisfactorily used to form such heat transfer pebbles or may be used in admixture with each other or with other materials. Pebbles formed of such materials, when properly fired, serve very well in high temperatures. Some pebbles such as mullite-alumina pebbles withstand temperatures above 3000° F. In the operation of the apparatus of this invention it is often desirable to carry on one reaction in the presence of catalytic pebbles and another reaction in the presence of inert pebbles in the same reaction chamber. In one reaction, for example, dehydrogenation catalysts such as group V or group VI metal oxides, such as oxides of vanadium, chromium or molybdenum, or an alumina base are used. It is desirable in the formation of such pebbles to utilize up to five per cent by weight of beryllium or magnesium oxide for stabilization purposes.

An object of this invention is to provide an improved pebble heater apparatus. Another object of the invention is to provide improved means for carrying out multiple reactions in a single reaction chamber. Another object of the invention is to provide means for carrying on catalytic reactions in pebble heater apparatus. Another object of the invention is to provide means for removing coke formed during the reaction of hydrocarbons. Another object of the invention is to provide means for utilizing coke formed in the reaction of hydrocarbons to furnish heat for such reactions. Another object of the invention is to provide means for utilizing coke as one of the reactants in the reaction chamber. Other and further objects and advantages will be apparent to those skilled in the art upon study of the accompanying discussion and the drawings.

Figure 3:
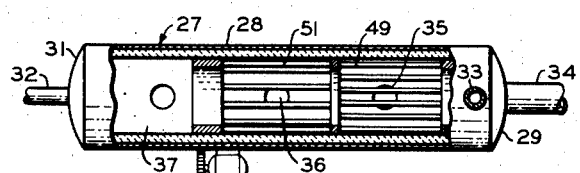

Understanding of the invention will be facilitated upon reference to the drawings in which Figure 1 is a schematic elevation of a pebble heater apparatus of this invention. Figure 2 is a modified schematic elevation of a pebble heater apparatus of this invention. Figure 3 is a top view, partly in section, of the pebble heater chamber taken on the 3—3 line of Figure 2.

Referring particularly to the device set forth as Figure 1 of the drawings, reactions chamber 11 comprises shell 12 which is closed at its upper and lower ends by closure members 13 and 14, respectively. Pebble inlet conduit 15 and effluent outlet conduit 16 are disposed in closure member 13 and pebble outlet conduit 17 extends from the lower portion of closure member 14. Additional effluent outlets are provided at intervals along the length of shell 12 when a plurality of separate reaction products is obtained. These additional outlets are preferably in the form of support members 21 which extend to points adjacent the lower side of distribution members 18 and 19. Perforate pebble distribution members 18 and 19 are disposed intermediate the ends of shell 12. Distribution members 18 and 19 are preferably formed as cones which are supported by support members 21 extending between shell 12 and pebble distribution members 18 and 19. Pebble distribution members 18 and 19 are smaller in outer diameter than the inner diameter of shell 12. An annular passage is formed between the periphery of pebble distribution members 18 and 19, which are centrally disposed within shell 12, and the walls of shell 12. Fluid inlet conduit 22 encircles at least a portion of the lower closure member 14 and is connected with the interior of shell 12 through closure member 14. Valve 23 is provided in fluid inlet conduit 22 for the purpose of regulating the flow of fluid therethrough. Fluid inlet conduit 24 encircles shell 12 at a point adjacent pebble distribution member 19 and is connected with the interior of shell 12. Valve member 25 is provided in fluid inlet conduit 24 so as to control the flow of fluid therethrough.

Pebble outlet conduit 17 is connected at its lower end to the lower end portion of elevator 26. Pebble heating chamber 27 comprises obliquely positioned shell 28 which is closed at its upper and lower ends by closure members 29 and 31, respectively, and a rotatable shell retained therein but not shown. Heating material inlet conduit 32 is provided in the lower closure member 31 and effluent outlet conduit 33 is provided in the upper end portion of shell 28. Pebble conduit 34 extends between the upper end portion of elevator 26 and closure member 29 of pebble heater chamber 27. Pebble outlets 35, 36, and 37 are disposed along the bottom side of chamber 27 intermediate the ends of that chamber. Outlets 35, 36, and 37 may be in the form of hoppers which are provided with separation means, not shown, in their upper ends along the line of the bottom of shell 28. Valves 38, 39, and 41 are provided in the lower ends of outlets 35, 36, and 37, respectively. Pebble conduits 42 and 43 extend from valves 39 and 41, respectively, to points immediately above and adjacent the apex of pebble distribution members 18 and 19, respectively. Pebble inlet conduit 15 is connected to valve 38.

The device of Figure 2 of the drawings is similar to that shown and described as Figure 1 of the drawings. Like parts are identified by like numerals. Pebble conduit 44 extends between valve 41 in pebble outlet 37 and closure member 13 of shell 12. Pebble conduits 45 and 46 extend from valves 39 and 38, respectively, to points immediately above and adjacent the apex of pebble distribution members 18 and 19, respectively. Figure 2 is further modified by the addition of a third fluid inlet conduit 47 which extends around at least a portion of shell 12 adjacent pebble distribution member 18. Valve 48 is provided in conduit 47 to control the flow of fluid therethrough.

Figure 3, which shows a partial section of pebble heater chamber 27, is provided with separation means which comprises bars 49 and 51 in the rotatable shell and over the upper ends of outlets 35 and 36. Bars 49 are spaced apart sufficiently to allow a first portion of pebbles of a given size to fall therebetween but so as to prevent the passage of pebbles of a larger diameter therebetween. Bars 51 are spaced apart so as to allow a second portion of pebbles of a diameter larger than the first portion to fall therebetween but so as to prevent pebbles of a larger diameter from escaping therebetween. Outlet 37, which is provided in the lower end portion of chamber 27, receives pebbles of the largest size utilized in the pebble heater apparatus and therefore does not require a pebble separation means in its upper end. Although the separation means is specifically shown as a plurality of spaced bar members, screens and other such separation means may be used to advantage. The flow of pebbles is not retarded materially with bars disposed in the direction of pebble flow. Rotation of the rotatable shell is obtained by rotation means such as a motor 30 communicating with the rotatable shell through shell 28.

In the operation of the device shown as Figure 2 of the drawings, heating material which may be in the form of hot gases or a fuel is introduced into the lower end portion of heater chamber 27 through inlet conduit 32. If a fuel is introduced into the lower portion of chamber 27, the fuel is burned in the presence of the pebbles in that chamber and resulting combustion gas is passed upwardly along the length of chamber 27 to effluent outlet conduit 33 through which the effluent material is removed. If a hot gas is utilized as the heating medium, that gas is introduced through inlet conduit 32 and after passing countercurrent to the flow of pebbles within chamber 27 is removed from that chamber through effluent outlet conduit 33. The pebbles having the smallest diameter are separated from the other pebbles within chamber 27 by allowing them to fall through the grill or grate formed by bars 49 in the rotatable shell and over the upper end of outlet 35. Those pebbles of the smallest diameter therefore contact the heating gas for the shortest period of time and are therefore raised to a temperature lower than the temperature of the other pebbles within the chamber. The pebbles of the next smallest size are removed through the grill or grate formed by bars 51 in the rotatable shell and over the upper end of outlet 36 and are contacted by the hot heating gas for a shorter period of time than are the largest pebbles which flow all the way through chamber 27 and are removed through pebble outlet 37. Separation of the pebbles is facilitated by rotating the inner rotatable shell. In this method of operation, therefore, the hottest pebbles are introduced into the upper end of chamber 11 through conduit 44 and flow downwardly through that chamber as a contiguous bed. The pebbles which are of second highest temperature and which are removed from chamber 27 through pebble outlet 36 are introduced into chamber 11 through pebble conduit 45 and are discharged therefrom immediately over the apex of pebble distribution member 18. The pebbles which are introduced into chamber 11 through conduit 44 and those which are introduced into that chamber through conduit 45 are mixed as they flow downwardly over the surface of pebble distribution member 18. The coolest pebbles are introduced into chamber 11 and are discharged from conduit 46 at a point immediately over the apex of pebble distribution member 19. The mixture of the hottest and the intermediate temperature pebbles is mixed with the coolest pebbles as they flow downwardly over the surface of pebble distribution member 19.

In one method of operation a gas oil and topped or reduced crude is preheated and partially or completely vaporized or vis-broken. The feed material is introduced into the lower portion of chamber 11 through valve 23 and inlet conduit 22. The feed materials are vaporized at a temperature within the range of between 600° F. and 900° F. during their contact with the cooler pebbles below pebble distribution member 19. As the vaporized materials flow upwardly through the perforate distribution member 19 countercurrent to the flow of pebbles between pebble distribution members 18 and 19, tars and similar heavy high carbon content semi-solid materials are removed therefrom by the pebbles. The vaporized materials are cracked either thermally or catalytically, depending upon the pebbles used, at a temperature, for example, within the range of between 900° F. and 1200° F. In this process, mixed phase cracking is in many cases conducted and at relatively low pressure. That type of operation results in gasoline fractions having improved octane numbers over those produced by conventional processes for mixed phase cracking in which it has usually been necessary to operate at relatively high pressures to avoid at least localized phase separations in cracking coils and resulting excessive lay-down of carbon. As the cracked materials pass through and around pebble distribution member 18 and upwardly countercurrent to the flow of pebbles above that support member, a normally gaseous hydrocarbon, such as propane or butane, is introduced into chamber 11 through conduit 47 and polyforming is carried out at a temperature, for example, within the range of between 1200° F. and 2000° F. The reaction products are removed from the upper portion of chamber 11 through effluent outlet conduit 16. If desired, all of the feed material may be introduced through inlet conduit 24 and the flow of pebbles may be diverted from conduits 46 by closing valve 38 as desired.

A similar process may be utilized in the production of benzene. A hydrocarbon material within the range of from a normally gaseous material, such as butane, to a gas oil is charged to the lower portion of the chamber through inlet conduit 22. The feed material is vaporized at a temperature within the range of from 600° F. to to 900° F. during contact with pebbles below distribution member 19. The vaporized material is cracked to ethylene in the chamber portion between members 19 and 18 at a temperature, for example, within the range of between 900° F. and 1200° F. As the cracked materials pass into the zone above baffle 18, an aromatization or hydrocyclization reaction takes place and the ethylene is converted to benzene at a temperature, for example, within the range of between 1200° F. and 2000° F.

In yet another method of the operation of the device shown as Figure 2 of the drawings, the smallest pebbles utilized in the system may constitute a dehydrogenation catalyst which, as has been disclosed, may be one of the group V or VI metal oxides. The balance of the pebbles may be inert and of one size. In such an operation, valve 39 may be closed so as to allow the flow of pebbles only through pebble conduits 44 and 46 or valve 38 may be closed and valve 39 opened so as to utilize conduit 45 instead of conduit 46. Ethane, propane, or butane is introduced into the lower portion of chamber 11 through inlet conduit 22 and is dehydrogenated in the presence of the dehydrogenation catalyst introduced into the lower portion of chamber 11 at a temperature within the range of between 1000° F. and 1100° F. The balance of the pebbles are introduced into the upper portion of the chamber at a temperature ranging between 1700° F. and 1800° F. The hydrocarbon material which flows upwardly countercurrent to the flow of the pebbles in chamber 11 is converted to ethylene in the presence of the dehydrogenation catalyst. The ethylene reaction product flows upwardly through and around the pebble support members and is contacted with the downflowing pebbles at a temperature within the range of between 1700° F. to 1800° F. In the contact with the pebbles at this temperature, a hydrocyclization reaction takes place and the ethylene is converted to benzene.

In yet another process, catalytic pebbles are separated from the other pebbles and are passed to an intermediate portion of chamber 11 through conduits 45 or 46 at a temperature within the range of between 950° F. and 1000° F. Inert pebbles within the range of between 1500° F. and 1650° F. are supplied to the upper end portion of chamber 11 through pebble conduit 44. A cracked gas oil fraction is introduced into the lower portion of chamber 11 through inlet conduit 24 and flows upwardly countercurrent to the flow of the catalytic pebbles. The gas oil fraction is catalytically cracked in the presence of the catalyst at a temperature of between 950° F. and 1100° F. The cracked products flow upwardly through the chamber countercurrent to the flow of pebbles and is converted to condensed ring aromatics in the presence of the pebbles at a temperature of between 1500° F. and 1650° F. Considerable carbon or coke is formed on the surface of the pebbles during the two conversions and under some conditions it is desirable to convert a portion of the coke to water gas. The conversion of coke to water gas takes place at about 1200° F. and higher. Steam is introduced into the lower portion of chamber 11 through inlet conduit 22 and flows upwardly through the bed of pebbles and coke material. The steam is superheated in the lower portion of the chamber and as it rises into that portion of the chamber at which a sufficient temperature is obtained, the coke material is converted to water gas, thereby regenerating the catalyst material. The water gas is removed from chamber 11 through conduit 16 together with the other reaction products and the mixture is passed to separation means, not shown, for separation of the resulting products. Any unconverted coke together with the pebbles is elevated to chamber 27 where a controlled surplus of oxygen is introduced through conduit 32 together with the heating material and the oxygen oxidizes the coke, thereby providing heat for the heating of the pebbles.

The device shown in Figure 1 of the drawings is especially desirable in those cases in which a rapid quench is needed to lower the temperature of reaction products. The hottest pebbles are inserted into chamber 11 at a point in the lower portion of that chamber. Reactant materials are introduced into the bottom of that chamber through inlet conduit 22 and flow upwardly through the pebble mass, reacting in the presence of the hot pebbles. Reaction products flow upwardly through the cooler mass of pebbles which are introduced through pebble conduit 42 and still cooler pebbles which are introduced through conduit 15. In the latter two masses of pebbles, the reaction products are quenched below their reaction temperature, thus preventing overcracking and the formation of carbonaceous or coke materials about the effluent outlet conduit of the reaction chamber.

The device of Figure 1 is also quite adaptable for use when one of the reactions is polymerization. Light hydrocarbons, such as $C_3$, $C_4$, and $C_5$ hydrocarbons are introduced into the lower portion of the reaction chamber and are cracked at a temperature of between 1000° F. and 1300° F. Olefins resulting from the reaction in the lower portion of the chamber are contacted with cooler pebbles in the upper portion of the reaction chamber at a temperature of, e. g., 600° F. to 1000° F. and are polymerized thereby.

The apparatus of this invention may be used in processes such as thermal and catalytic cracking as heretofore described; isomerization, for example, the conversion of butene-1 to isobutylene; dehydrogenation, for example, the conversion of ethylbenzene to styrene; condensation, for example, the reaction of ethylene with butadiene to form benzene; and high temperature alkylation employing hydrogen or carbon dioxide as a catalyst.

Pebble heater chamber 27 is obliquely disposed at an angle from the horizontal as heretofore disclosed. The chamber is preferably disposed at an angle of between 5° and 30° from the horizontal. Such positioning assures good pebble flow through the pebble heating chamber during the heating operation.

Disclosure herein has been substantially limited to countercurrent flow of pebbles and reactants. The device of this invention may be used to provide concurrent flow through one chamber portion and countercurrent flow through another portion. For example, when a fuel oil or residuum is introduced into the chamber near its upper end, concurrent flow of that material and the heated pebbles is obtained. Steam, hydrogen, or a light hydrocarbon may be introduced into the lower portion of the chamber and flow countercurrent to the flow of pebbles through a portion of the chamber, thereby superheating, preheating, or cracking those fluids which are subsequently admixed with the downflowing oil to effect cracking, hydrogenolysis, polyforming, hydroforming, gas reversion, or cracking.

The process of this invention may be modified by screening the pebbles to separate them into streams of various size pebbles. The streams are then passed to separate heating chambers where they are heated to temperatures at which they are to be utilized in the reaction chamber. Conduits 44, 45, and 46 are attached to the separate heating chambers in such a modified process.

The combination of processes with which the pebble heater apparatus of this invention may be used advantageously are many and are varied. It is believed that many modifications and advantages will be apparent to those skilled in the art upon study of the accompanying disclosure and the drawings. Such modifications are deemed to be within the spirit and the scope of this disclosure.

I claim:

1. An improved pebble heater apparatus comprising in combination a first closed upright shell; a first pebble inlet in the upper end portion of said first shell; at least one additional pebble inlet in said first shell intermediate its ends; a first fluid inlet in the bottom portion of said first shell; a second fluid inlet in said first shell adjacent the level of at least one said additional pebble inlet therein; a second closed shell obliquely positioned above said first shell; a first pebble conduit extending between the bottom side of said second shell and said first pebble inlet in said first shell; an additional pebble conduit extending between another point on the bottom side of said second shell and each said additional pebble inlet in said first shell; pebble separation means in the upper ends of at least all except the lowermost said pebble conduits extending from the bottom side of said second shell, said pebble separation means providing progressively wider openings into progressively lower pebble conduits; an elevator; a second pebble conduit extending between the lower end of said first shell and the lower end portion of said elevator; a third pebble conduit extending between the upper end portion of said elevator and the upper end portion of said second shell; heating material inlet means in the lower end of said second shell; and effluent outlet means in the upper end portion of said second shell.

2. An improved pebble heater apparatus comprising in combination a first closed upright shell; a first pebble inlet in the upper end portion of said first shell; an effluent outlet conduit in the upper end portion of said first shell; at least one additional pebble inlet in said first shell intermediate its ends; a first shell inlet in the bottom portion of said first shell; a second fluid inlet in said first shell adjacent the level of at least one said additional pebble inlet therein; a second closed shell obliquely positioned above said first shell; a first pebble conduit extending between the bottom end portion of said second shell and said first pebble inlet in said first shell; an additional pebble conduit extending between points disposed along the bottom side of said second shell and each said additional pebble inlet in said first shell; pebble separation means in the upper ends of at least all except the lowermost said pebble conduits extending from the bottom side of said second shell, said pebble separation means providing progressively wider openings into progressively lower pebble conduits; an elevator; a second pebble conduit extending between the lower end of said first shell and the lower end portion of said elevator; a third pebble conduit extending between the upper end portion of said elevator and the upper end portion of said second shell; heating material inlet means in the lower end of said second shell; and effluent outlet means in the upper end portion of said second shell.

3. The pebble heater apparatus of claim 2, wherein at least one conical baffle member is coaxially disposed in said first shell, intermediate its ends and spaced from the walls of said first shell so as to form an annulus for pebble flow therebetween; one of said additional pebble inlets extending to a point over the apex of each said conical baffle; said first pebble conduit extends between the lower end portion of said second shell and said first pebble inlet in said first shell; at least one pebble separation means in the bottom side of said second shell; and one of said additional pebble conduits extending between said separation means and each said second pebble inlet.

4. The pebble heater apparatus of claim 3, wherein said second shell is disposed at an angle between 5° and 30° from the horizontal.

5. The pebble heater apparatus of claim 4, wherein a rotatable shell having at least two separation means therein is provided in the bottom side of said second shell, said separation means comprising a grill extending around said rotatable shell and the bars of the grill nearer the upper end of said second shell being spaced closer together than in each succeeding grill in said second shell.

6. The pebble heater apparatus of claim 1, wherein at least one conical baffle member is coaxially disposed in said first shell, intermediate its ends and spaced from the walls of said first shell so as to form an annulus for pebble flow therebetween; one of said additional pebble inlets extending to a point over the apex of each said conical baffle; said second shell is obliquely positioned above said first shell at an angle of from 5° to 30° from the horizontal; a rotatable shell in said second shell; at least one pebble separation means in said rotatable shell; said first pebble conduit extends between the pebble outlet below the separation means nearest the upper end of said second shell and said first pebble inlet; and one of said additional pebble conduits extending between each successive pebble outlet point in the bottom side of said second shell and one of said additional pebble inlets which extends to a point over one of said conical baffles disposed successively lower in said first shell.

7. A method for subjecting hydrocarbons to different reaction temperatures in a single reaction zone which comprises introducing a first portion of relatively large diameter pebbles into the upper end portion of a reaction zone at a temperature within the range of between 1200° F. and 2000° F.; introducing at least one other portion of pebbles of a diameter smaller than said first portion into said reaction zone at a point intermediate its upper end portion and its lower end portion and at a temperature within the range of between 600° F. and 1200° F.; introducing a hydrocarbon fluid into the lower portion of said reaction zone; reacting said hydrocarbon fluid in the presence of a mixture of said pebbles at a temperature within the range of between 600° F. and 1200° F.; passing resulting reaction products upwardly in said reaction zone into contact with said larger pebbles at a temperature within the range of between 1200° F. and 2000° F.; reacting said reaction products in the presence of said hotter pebbles; removing resulting reaction products from the upper portion of said reaction zone; gravitating said pebbles from the lower portion of said reaction zone, elevating said pebbles to a single pebble heating zone; heating said pebbles in said pebble heating zone; separating said smaller pebbles from said larger pebbles in said pebble heating zone and gravitating them from said pebble heating zone to said intermediate point of said reaction chamber upon reaching a temperature within the range of between 600° F. and 1200° F.; further heating said larger pebbles in said pebble heating zone to a temperature within the range of between 1200° F. and 2000° F.; and gravitating said larger pebbles from said pebble heating zone into the upper end portion of said reaction zone.

8. A method for subjecting hydrocarbons to different reaction temperatures in a single reaction chamber which comprises heating pebbles of a plurality of sizes in a single pebble heating zone at different temperatures according to pebble sizes; gravitating a first portion of said pebbles of a smaller size from said heating zone at a first reaction temperature to a given level in a reaction zone; gravitating additional said pebbles of at least one successively larger size and at a different reaction temperature than said first pebbles from said heating zone to at least one other level within said reaction zone successively disposed from said first pebbles according to successive temperatures of said successively larger pebbles; gravitating said pebbles through said reaction zone as a contiguous mass; introducing a hydrocarbon fluid into the lower portion of said reaction zone; passing said hydrocarbon fluid upwardly through said reaction zone, whereby said hydrocarbon fluid is successively reacted in direct heat exchange with pebbles at successively higher temperatures; removing resulting reaction products from the upper portion of said reaction zone; gravitating said pebbles from the bottom of said reaction zone; and elevating said pebbles to said pebble heating zone.

9. A method for subjecting hydrocarbons to different reaction temperatures in a single reaction chamber which comprises heating pebbles of a plurality of sizes in a single pebble heating zone at different temperatures according to pebble sizes; gravitating smaller pebbles from said heating zone at a lower reaction temperature to a given level in the lower portion of a reaction zone; additionally heating successively larger pebbles in said heating zone; successively gravitating said successively larger pebbles at successively higher reaction temperatures from said pebble heating zone to successively higher levels within said reaction zone; gravitating said pebbles through said reaction zone as a contiguous mass; introducing a hydrocarbon fluid into the lower portion of said reaction zone; passing said hydrocarbon fluid upwardly through said reaction zone, first reacting said hydrocarbons in contact with said pebbles at the lower temperature and then successively reacting resulting reaction products in direct heat exchange with the successively hotter pebbles; removing resulting reaction product from the upper portion of said reaction zone; gravitating said pebbles from the bottom of said reaction zone; and elevating said pebbles to said pebble heating zone.

10. The method of claim 8, wherein said smaller pebbles are gravitated into the upper end portion of said reaction zone and successively larger pebbles are gravitated into said reaction zone at successively lower levels.

RUSSELL K. SIMMS.

REFERENCES CITED

The following references are of record in the file of this patent:

UNITED STATES PATENTS

| Number | Name | Date |
|---|---|---|
| 2,441,170 | Rose et al. | May 11, 1948 |
| 2,466,005 | Crowley, Jr. | Apr. 5, 1949 |
| 2,490,336 | Crowley, Jr. | Dec. 6, 1949 |